United States Patent
Lambright et al.

(10) Patent No.: US 7,639,134 B2
(45) Date of Patent: Dec. 29, 2009

(54) ITEM-LEVEL VISIBILITY OF NESTED AND ADJACENT CONTAINERS

(75) Inventors: Stephen J. Lambright, San Francisco, CA (US); Blair B. LaCorte, Belvedere, CA (US); Ravindra U. Rajapakse, San Francisco, CA (US); David L. Shannon, State College, PA (US); Steven J. Farrell, Sunnyvale, CA (US)

(73) Assignee: Savi Technology, Inc., Sunnyvale, CA (US)

( * ) Notice: Subject to any disclaimer, the term of this patent is extended or adjusted under 35 U.S.C. 154(b) by 0 days.

(21) Appl. No.: 11/010,188

(22) Filed: Dec. 9, 2004

(65) Prior Publication Data
US 2005/0162270 A1    Jul. 28, 2005

Related U.S. Application Data

(63) Continuation-in-part of application No. 10/841,368, filed on May 6, 2004.

(60) Provisional application No. 60/528,334, filed on Dec. 9, 2003, provisional application No. 60/468,930, filed on May 7, 2003, provisional application No. 60/468,929, filed on May 7, 2003.

(51) Int. Cl.
*G08B 13/14* (2006.01)

(52) U.S. Cl. .................. 340/572.1; 340/10.1; 340/10.5

(58) Field of Classification Search .............. 340/572.1, 340/572.4, 7.24, 7.25, 10.1, 5.92, 10.5
See application file for complete search history.

(56) References Cited

U.S. PATENT DOCUMENTS

| 4,688,244 | A |   | 8/1987  | Hannon et al.              |
|-----------|---|---|---------|----------------------------|
| 4,750,197 | A |   | 6/1988  | Denekamp et al.            |
| 5,565,858 | A | * | 10/1996 | Guthrie ............ 340/10.33 |
| 5,835,012 | A |   | 11/1998 | Wilk                       |
| 5,841,365 | A | * | 11/1998 | Rimkus ............. 340/5.61  |

(Continued)

FOREIGN PATENT DOCUMENTS

CN          1283272 A       2/2001

OTHER PUBLICATIONS

Notification Of The International Search Report Or The Declaration and Written Opinion Of The International Searching Authority, PCT/US04/14206, Apr. 28, 2005,9 pages.

(Continued)

*Primary Examiner*—Travis R Hunnings
(74) *Attorney, Agent, or Firm*—Fenwick & West LLP

(57) ABSTRACT

An identification device establishes a relative hierarchy of associated containers as logistical units, providing multi-layer visibility of nested and adjacent containers. The relative hierarchy comprises lower-layer containers and upper-layer containers relative to the identification device. An integrated reader device reads heterogeneous tag types. This allows disparate tag types simultaneously using a single device.

12 Claims, 15 Drawing Sheets

U.S. PATENT DOCUMENTS

| | | | |
|---|---|---|---|
| 5,892,441 A | 4/1999 | Woolley et al. | |
| 5,959,568 A | 9/1999 | Woolley | |
| 6,002,343 A | 12/1999 | Auerbach et al. | |
| 6,061,644 A | 5/2000 | Leis | |
| 6,148,291 A | 11/2000 | Radican | |
| 6,211,781 B1 | 4/2001 | McDonald | |
| 6,438,359 B1 | 8/2002 | Bossard et al. | |
| 6,542,114 B1 | 4/2003 | Eagleson et al. | |
| 6,662,068 B1 | 12/2003 | Ghaffari | |
| 6,714,121 B1 * | 3/2004 | Moore | 340/10.3 |
| 6,720,888 B2 | 4/2004 | Eagleson et al. | |
| 6,753,775 B2 | 6/2004 | Auerbach et al. | |
| 6,765,484 B2 | 7/2004 | Eagleson et al. | |
| 6,804,578 B1 | 10/2004 | Ghaffari | |
| 6,820,805 B2 | 11/2004 | Stevens | |
| 6,879,257 B2 * | 4/2005 | Hisano et al. | 340/568.2 |
| 6,888,241 B1 | 5/2005 | Korn et al. | |
| 6,927,687 B2 | 8/2005 | Carrender | |
| 6,940,392 B2 | 9/2005 | Chan et al. | |
| 6,972,682 B2 * | 12/2005 | Lareau et al. | 340/568.1 |
| 6,973,385 B2 | 12/2005 | Ulrich | |
| 7,005,985 B1 * | 2/2006 | Steeves | 340/572.1 |
| 7,042,354 B2 | 5/2006 | Auerbach et al. | |
| 7,075,412 B1 | 7/2006 | Reynolds et al. | |
| 7,075,441 B2 | 7/2006 | Tsukamoto | |
| 7,194,438 B2 | 3/2007 | Sovio et al. | |
| 2001/0018672 A1 | 8/2001 | Petters et al. | |
| 2002/0029178 A1 | 3/2002 | Wiederin et al. | |
| 2003/0011474 A1 | 1/2003 | Ng | |
| 2003/0125980 A1 | 7/2003 | Ribeiro | |
| 2003/0227382 A1 | 12/2003 | Breed | |
| 2003/0227392 A1 | 12/2003 | Ebert et al. | |
| 2004/0100379 A1 | 5/2004 | Boman et al. | |
| 2004/0153344 A1 | 8/2004 | Bui et al. | |
| 2004/0177032 A1 | 9/2004 | Bradley et al. | |
| 2005/0109845 A1 | 5/2005 | Ghaffari | |
| 2005/0110636 A1 | 5/2005 | Ghaffari | |
| 2005/0231365 A1 | 10/2005 | Tester et al. | |
| 2005/0248438 A1 | 11/2005 | Hughes et al. | |
| 2005/0288937 A1 | 12/2005 | Verdiramo | |
| 2006/0152366 A1 | 7/2006 | Sironi et al. | |
| 2007/0164857 A1 | 7/2007 | Odenwald et al. | |

OTHER PUBLICATIONS

Notification of Transmittal of the International Search Report and the Written Opinion, PCT/US04/14192, Jan. 18, 2006,.

International Search Report and the Written Opinion, PCT/US04/41501, Nov. 3, 2005, 11 pages.

"The Intermec® Guide to RFID Reader Selection," Intermec Technologies Corporation, 2004, 6 pages.

Notification of the International Search Report and Written Opinion, PCT/US04/11086, Sep. 5, 2006, 10 pages.

"RFID Overview: Introduction to Radio Frequency Identification," Intermec Technologies Corporation, 1999, pp. 1-7.

"Supply Chain RFID: How It Works and Why It Pays," Intermec Technologies Corporation, 2004, pp. 1-12.

PCT International Search Report and Written Opinion, PCT/US04/41767, Mar. 13, 2007, 25 pages.

Notice of Preliminary Rejection, Korean Application No. 10-2006-7013827, Jul. 31, 2007, 12 pages.

Korean Office Action, KR 10-2006-7013827, Feb. 28, 2008, 9 pages.

Engels, D.W., "RFID: The Technical Reality," FTC: RFID: Applications and Implications for Consumers, presented Jun. 21, 2004, Washington, D.C., [online] [Retrieved on Nov. 28, 2007] Retrieved from the Internet<URL:http://www.ftc.gov/bcp/workshops/rfid/engels.pdf>.

PCT International Search Report and Written Opinion, PCT/US07/68591, Feb. 10, 2008, 8 pages.

Notice of Preliminary Rejection, Korean Application No. 10-2006-7013827, Jul. 31, 2007, 12 pages.

Korean Office Action, Korean Application No. 10-2008-7009827, Jul. 21, 2008, 9 pages.

Chinese Office Action, Chinese Application No. 200480041281X, Jul. 18, 2008, 12 pages.

European Supplementary Search Report, European Patent Application No. 04813766.5, Sep. 8, 2008, 3 pages.

Chinese Office Action, Chinese Application No. 200480041282.4, Aug. 12, 2008, 9 pages.

European Examination Report, Application No. 04813766.5, Dec. 12, 2008, 5 pages.

Chinese Office Action, Chinese Patent Application No. 200480011962.1, Jan. 16, 2009, 15 pages.

Chinese Office Action, Chinese Application No. 200480011962.1, Jul. 24, 2009, 14 pages.

Chinese Office Action, Chinese Application No. 2004800411281.X, Aug. 7, 2009, 9 pages.

* cited by examiner

ITEM-LEVEL VISIBILITY OF NESTED AND ADJACENT CONTAINERS

RELATED APPLICATIONS

This application: claims priority under 35 U.S.C. § 119(e) to U.S. patent application Ser. No. 60/528,334, filed on Dec. 9, 2003, entitled "Concept for Nested Visibility of Logistics Units, Including Handheld Nested Visibility," by Stephen Lambright et al.; claims priority under 35 U.S.C. § 120 as a continuation-in-part of U.S. patent application Ser. No. 10/841,368, filed on May 6, 2004, entitled "Nested Visibility for a Container Hierarchy," by Stephen Lambright et al., which claims priority under 35 U.S.C. § 119(e) to U.S. patent application Ser. No. 60/468,930, filed on May 7, 2003, entitled "Concepts for Smart Container," by Stephen Lambright et al. and claims priority under 35 U.S.C. § 119(e) to U.S. patent application Ser. No. 60/468,929 filed on May 7, 2003, entitled "Concepts for Nested Visibility of Logistics Units," by Stephen Lambright et al.; and is related to U.S. patent application Ser. No. 11/009,691, filed Dec. 9, 2004, entitled "Integrated Active and Passive Tag Reader Device," by Stephen Lambright et al, the entire contents of each being herein incorporated by reference.

FIELD OF THE INVENTION

This invention relates generally to tracking containers and their contents and, more specifically, to providing item-layer visibility and verifying manifest information by interrogating multiple heterogeneous layers of containers.

BACKGROUND OF THE INVENTION

Ever-increasing global trade underscores a modern global economy that depends on goods transported in a global supply chain. Generally, a global supply chain is a network of international suppliers, manufacturers, distributors, and other entities that handle goods from their component parts to consumer consumption. For example, semiconductor testing equipment is exported from the United States to Taiwan, where semiconductors are processed and then sent to Malaysia for assembly into computers. Subsequently, the computers are shipped to warehouses in the United States, and ultimately, to consumer outlets for consumption.

However, current tracking systems have difficulty tracking container contents because goods are nested within several containers during shipping and large shipping containers are stacked. For example, in terms of a nesting as defined by the ISO (International Standards Organization) item layers are packed into package layers, which are in turn stored in carton layers. Several carton layers are stored in a unit load layers, and several unit load layers are stored in container layers. In addition, containers are stacked several layers deep. Note that "container" is used here in a broader sense that includes each ISO layer and other enclosures. A vehicle transports several container layers at a time. Thus, an operator can only assume that an item is on a vehicle based on static nesting and stacking information collected during packing. Accordingly, if the goods were stolen during shipment, or lost by being shipped to a wrong location, it is not possible to discover the missing goods until each layer of container is opened at a consignee.

While a container configuration such as the above is used for purposes of description herein, the present invention is applicable to any grouping and any number of levels of subgrouping.

A related problem is that current tracking systems have no real-time information for tracking container contents, especially at the item-layer. Because physical contents travel separately from data about the contents, the tracking system is not able to provide dynamically verified information about contents. A port operator needing to know the contents of the container must log-in to the tracking system to retrieve static information. Moreover, the data about contents is often delayed and, thus, the operator may not even be able to retrieve some information.

Additionally, many large consumer stores are requiring that products use RFID (Radio Frequency IDentification) tags in order to improve supply chain efficiency sufficient for just in time merchandise stocking. But these tags are typically heterogeneous and, thus not suitable to intra-tag communication. Thus, conventional tags wait until acted upon from a tag reader by passively outputting information to a centralized system. It is this centralized system that traditionally determines any relationship between goods.

In addition, heterogeneous tags traditionally require separate tag readers for each tag type. For example, for containers including both active and passive type tags, a separate device is required to obtain information from each tag type. Thus, in addition to the need for two separate devices for reading these tags, separate readers provide no information about the inter-relationship between the heterogeneous tag types.

Therefore, what is needed is a robust system providing nested and adjacent visibility of a plurality of associated containers. The solution should further provide item-layer visibility and end-to-end tracking of goods within a global supply chain.

SUMMARY OF THE INVENTION

The present invention meets these needs with systems and methods to provide multi-layer visibility of nested and adjacent containers. The systems can further provide a virtual warehouse enabled by item-layer visibility that tracks individual items end-to-end through a global supply chain. Thus, a central system can quickly and easily gather information about each of the associated containers having heterogeneous automatic identification technology by interrogating any one or all of the layers.

In some embodiments, a nested container comprises a container with an identification device. The identification device acts as an agent by autonomously gathering and processing information for the central system. The identification device provides visibility through a variety of automatic identification technologies such as active or passive RFID (Radio Frequency IDentification) tags, bar codes, EPC (Electronic Product Code) compliant tags, or any other devices capable of communicating its identification information. By automatically sending hierarchy and adjacent container information to the central system at, for example, checkpoints in a global supply chain, or in between checkpoints, with a satellite, the identification device provides item-layer visibility. In one embodiment, the nested container automatically verifies AMR (Automated Manifest Rule) information by downloading from the central system and comparing to visible items.

In some embodiments, the identification device comprises processor that establishes a relative hierarchy of lower-layer containers, down to the item-layer, and upper-layer containers. Example layers include an item layer, a unit load layer, an intermodal container layer, and the like. To establish the hierarchy, the processor sends interrogation signals to neighboring containers in order to retrieve identification information and layer information. The information can relate to both individual information of the responding container and hierarchical and adjacent information about neighbors to the responding container. Also, the processor sends its own identification information and layer information responsive to received interrogation signals. From a nested container, the processor outputs the relative hierarchy to, for example, an integrated reader device. In some embodiments, the identification device further comprises a transceiver to send and receive identification and/or layer information. The transceiver comprises, for example, an RFID transceiver operating at ultra high frequency (UHF).

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTIONS OF THE PREFERRED EMBODIMENTS

A system and method for nested visibility are disclosed. The system according to some embodiments of the present invention is set forth in FIGS. 1-4, and 7, and methods operating therein, according to some embodiments of the present invention, are set forth in FIGS. 5, 6, and 8-10.

The accompanying description is for the purpose of providing a thorough explanation with numerous specific details. Of course, the field of cargo tracking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

Figure 1:
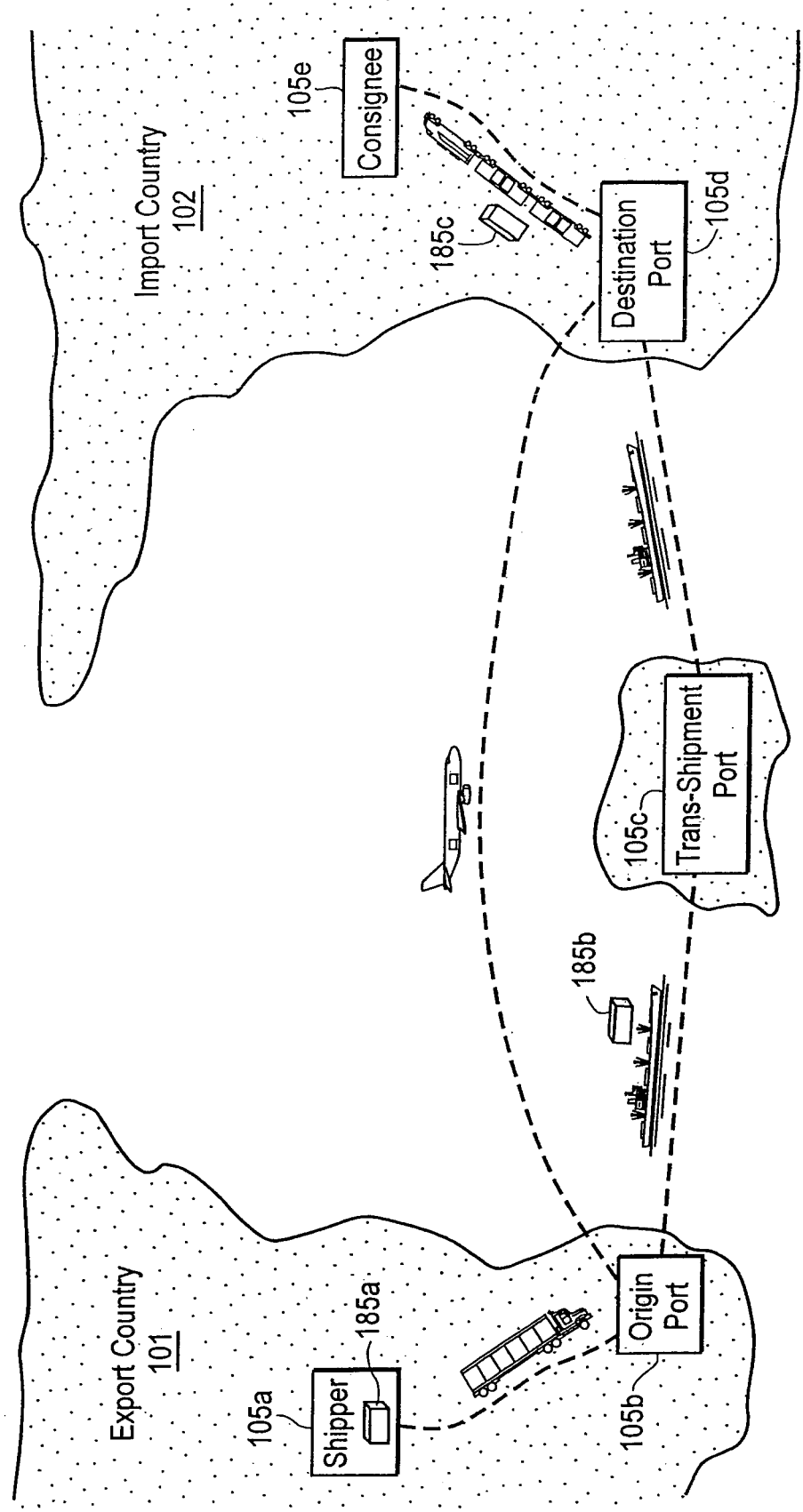
FIG. 1 is a schematic diagram illustrating an exemplary global supply chain according to one embodiment of the present invention.

The processes, features, or functions of the present invention can be implemented by program instructions that execute in an appropriate computing device. Example computing devices include electronic tags, enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripting code FIG. 1 is a schematic diagram illustrating an exemplary global supply chain 100 including nested and/or adjacent containers 185 according to one embodiment of the present invention. Note that FIG. 1 is merely an example global supply chain 100 that can have various geographical configurations, modes of transport, etc. within the scope and spirit of the present invention. In this example, the global supply chain 100 comprises a shipper 105a, an origin port 105b, a transshipment port 105c, a destination port 105d, and a consignee 105e.

The global supply chain 100 is used by a network of international suppliers, manufacturers, distributors, and other entities that handle goods from their component parts to consumer consumption. Accordingly, nested and/or adjacent containers 185 and other cargo pass through the network points, checkpoints, ports, etc. The shipper 105a and the consignee 105e can be direct or indirect partner entities or units within a single entity exchanging a container 185 though a trade route. For example, a manufacturer sends computer components to an assembly plant by truck freight, which in turn ships assembled computers to a warehouse. The origin and destination ports 105b-c can be a shipping dock, an airport, a customs agency, an NVOCC (Non-Vessel Operating Common Carrier) or any other entity that sends and/or receives goods over a trade route. An internal supply chain is a similar network operated by a single entity or closelyassociated entities, and the principles of the present invention are applicable to such internal supply networks as well.

At a high-level, the shipper 105a can transport a container 185 to the consignee 105e via one of many trade routes. As a first mode of transportation, a truck transports the container 185 from the shipper 105a to the origin port 105b. As a second and a third mode of transportation, a first vessel and a second vessel transport the container 185 from the origin port 105b to the destination port 105d with a transfer at a transshipment port 105c. As a fourth mode of transportation, a freight train transports the container to the consignee 105e. In the case of international transportation, governmental agencies of the corresponding countries 101, 102, such as a Customs and National Security Agencies, exercise oversight over components of the primary network while private parties exercise oversight over components of the extended network. Note that, however, in one embodiment, the transportation occurs within the borders of a single country. As such, exporting and importing is between intranational geographical locations (e.g., between two states, cities, provinces, etc.) overseen by, for example, a security agency or an intranational governmental agency. Problematically, checkpoints cannot easily gather information about typical containers having other containers layered therein.

A nested container 185 addresses this visibility problem. The nested container 185 acts as an agent by autonomously gathering and processing information for presentation to the central system. The nested container 185 associates itself with contained and adjacent containers to form a relative hierarchy of logistical units. The relative hierarchy accounts for containers of higher layers and containers of lower layers. Preferably, a nested container 185 at the highest layer outputs the relative hierarchy in response to interrogations, however, any layer can do so. In one embodiment, the nested container 185 enables a master status upon determination that it is at the highest layer. In another embodiment, the nested container 185 updates the relative hierarchy upon detecting changes in composition (e.g., when a previously nested container fails to respond to a periodic poll).

As used herein, "layers" within the hierarchy can be defined in a variety of ways. Generally, each layer is capable of identifying itself in response to an interrogation, and is defined relative to other layers. A lower layer is capable of being contained within a higher layer. For example, an item or good at a first layer is contained within its packaging at a second layer, and a packaging is contained within a carton of layer three. A spectrum of layers can extend from an item and at the lowest layer to a vehicle at the highest layer. Preferably, less capable automatic identification technologies, such as bar codes, are within lower layers, and more capable automatic identification technologies, such as active RFID (Radio Frequency IDentification) tags, are within higher layers.

As the container 185 travels on its route through the global supply chain 100, it may be interrogated at different checkpoints. When a truck is unloaded at the origin port 105b, pallets that were once associated can become separated and possibly reassociated. Since the truck is no longer the highest layer of the hierarchy, the nested containers 185 of relatively lower layers are able to provide similar information to an interrogator. Further embodiments of nested containers 185 and methods operating therein are described in below.

Figure 2A:
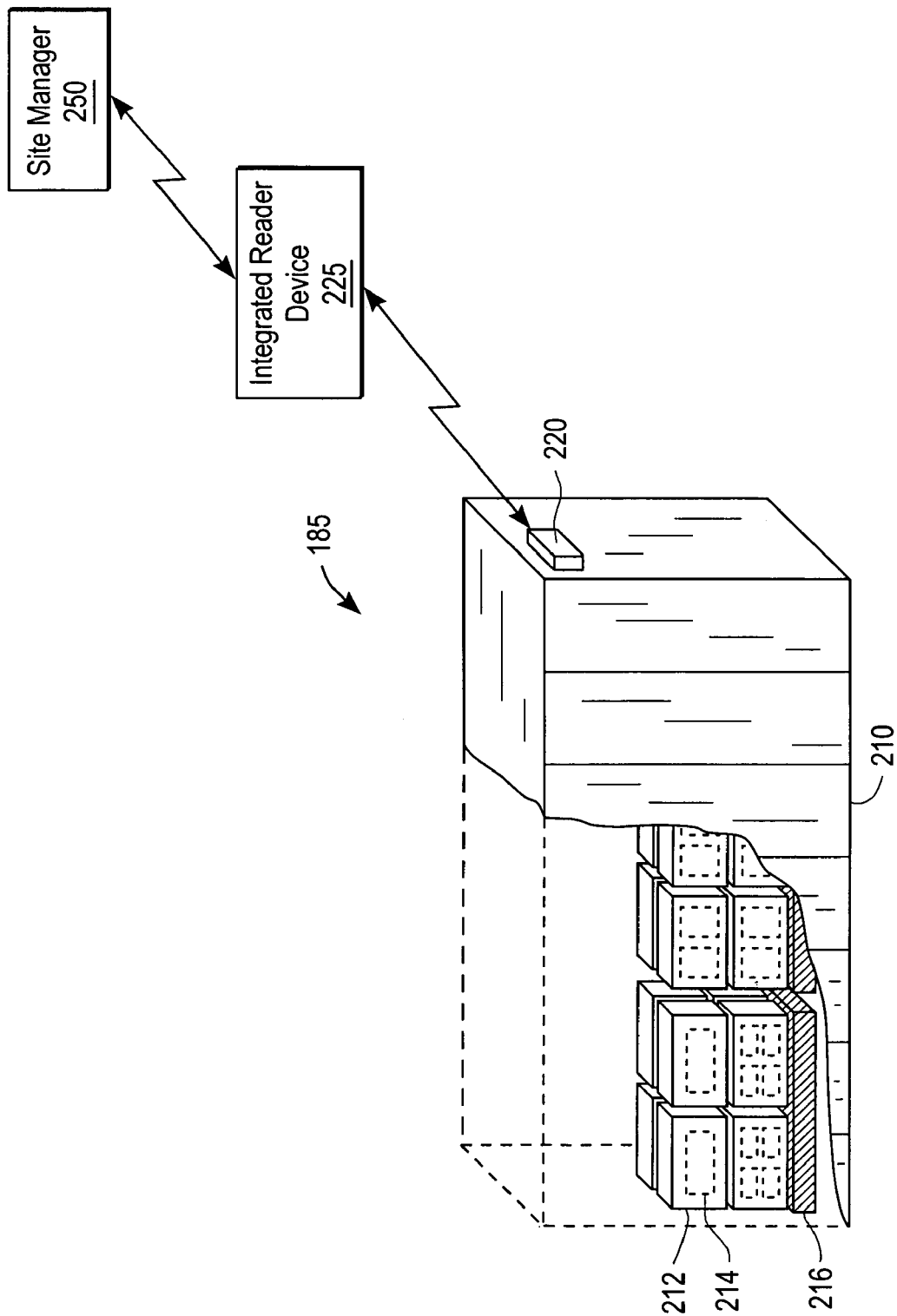
FIGS. 2A-C are schematic diagrams illustrating example physical layers within a container hierarchy according to some embodiments of the present invention.
Figure 2B:
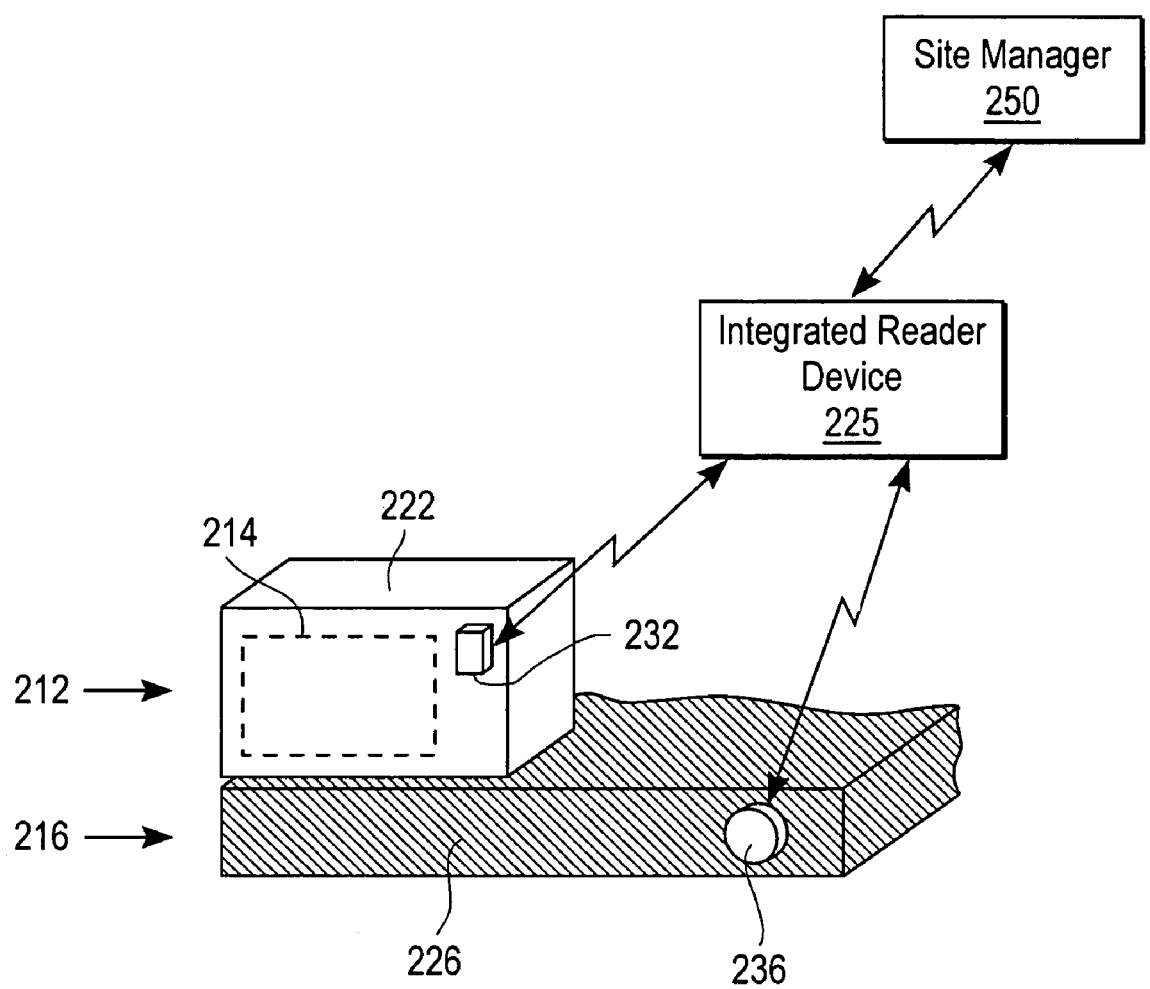
Figure 2C:
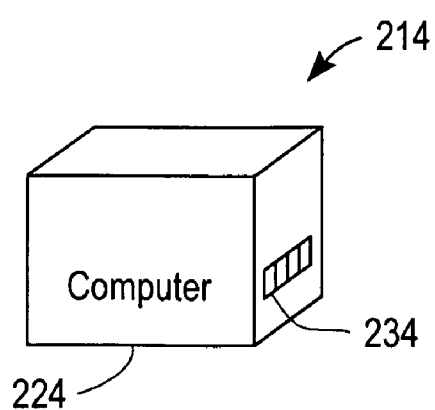

FIGS. 2A-C are schematic diagrams illustrating example physical layers within a container hierarchy according to some embodiments of the present invention. Accordingly, a nested container 185 at the highest layer comprises a container 210 with an identification device 220 as shown in FIG. 2A. The nested container contains a nested pallet 216 holding nested containers 212 with nested items 214. The identification device 220 is in communication (preferably wirelessly) with an integrated reader device 225 which in turn communicates with a site server or manager 250. The site server 250 can be a local portion of a centralized system for security, tracking, and the like. The integrated reader device 225 can collect information about containers 185, 210, 212, 214, and the nested pallet 216 for local analysis or uploading. The integrated reader device 225 can also write instructions and/or data to the nested containers 185, 210, 212, 214 and the nested pallet 216. The integrated reader device 225 is described in greater detail in conjunction with FIG. 7A.

FIG. 2B illustrates the nested container 212 at a lower layer comprising a container 222 with an identification device 232. The nested pallet 216 as shown in this embodiment, is a platform for a group of nested containers 212 that is useful during, for example, movement by a forklift. The nested pallet 216 comprises a pallet 226 and an identification device 236. Both identification devices 232, 236 are also in communication with the integrated reader device 225. Also, FIG. 2C illustrates the nested container 214 at a lower layer relative to the nested container 212 comprising an item 224 with a bar code 234 or other inexpensive identification device.

Figure 2D:
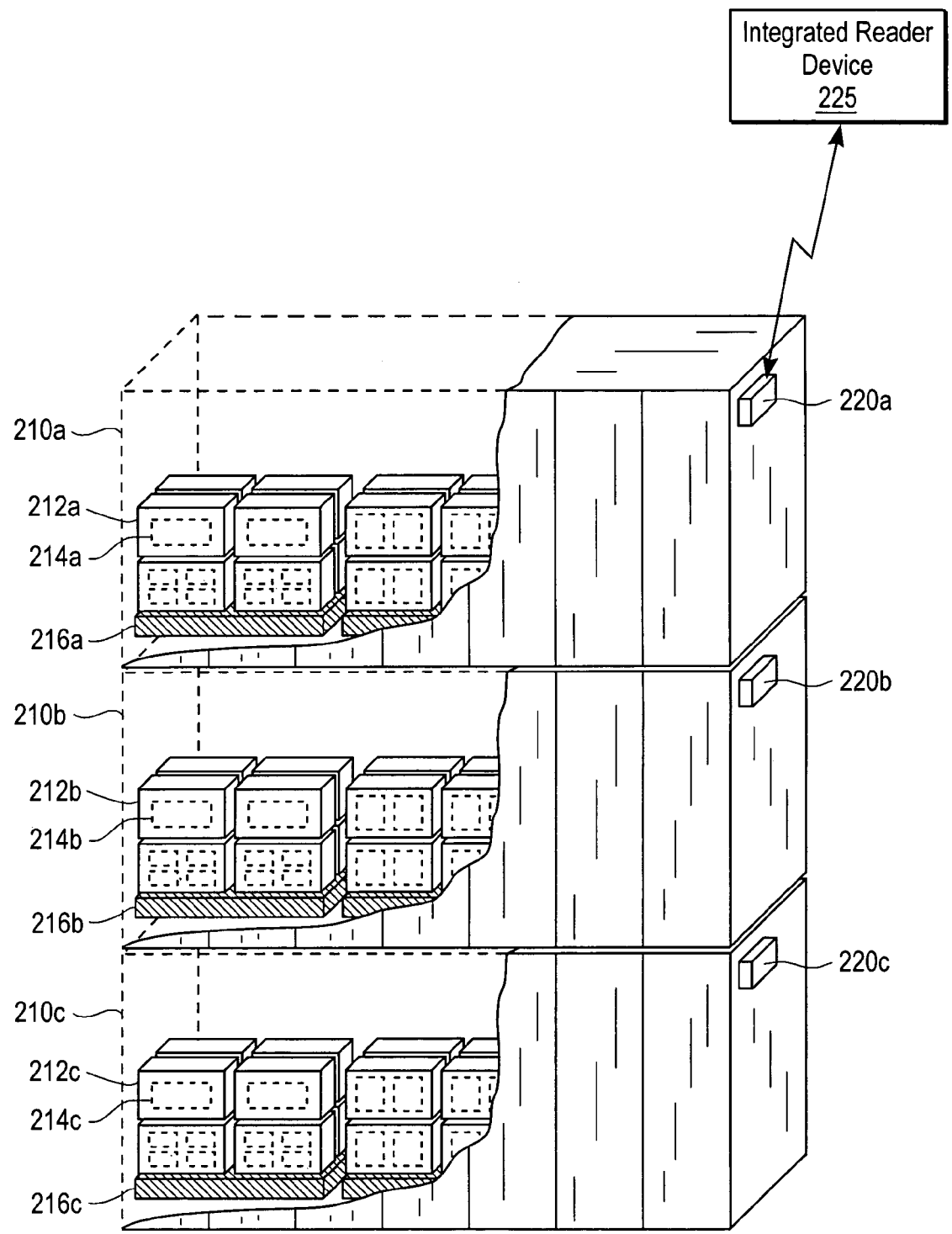
FIG. 2D is a schematic diagram showing adjacent containers with nested containers therein according to one embodiment of the present invention.

FIG. 2D is a schematic diagram showing adjacent containers 210a-c, each with nested containers 212, 214 therein. Each adjacent container 210 has an identification device 220. One or more of the identification devices 220 may be in communication (preferably wirelessly) with an integrated reader device 225. The integrated reader device 225 can collect information about containers 210 for local analysis or uploading. In addition, the identification devices 220 on adjacent containers 210 are in communication with each other.

As used herein, "containers" can comprise common enclosures referred to as, for example, goods, items, packages, cargo, intermodal containers, freight, boxes, and the like. Containers can also comprise ISO (International Organization for Standardization) standardized enclosures in the form of layers or units referred to as, for example, IMCs (Inter-Modal Container), IBCs (Intermediate Bulk Container), RTCs (Reusable Transport Container), ULDs (Unit Load Devices), the layers described below with respect to FIG. 4, and the like. Note that the containers 210, 222, 224 are merely examples as it can vary in size, shape, and configuration (e.g., more than two doors).

The identification devices 220, 232, 236 although at different layers, are each capable of independently communicating with the integrated reader device 225. Thus, the identification devices 220, 232 need not daisy chain information up a ladder as the integrated reader device 225 can gather information from either source. In one embodiment, the identification devices 220, 232 automatically verify AMR (Automated Manifest Rule) information by downloading from the central system and comparing to visible items. As a result, the identification devices 220, 232 can verify AMR to a central security system, and inform an operator or agent as to whether correct goods are being loaded, unloaded, etc.

The identification devices 220, 232, 234 are coupled, attached, mounted, or otherwise associated with the containers 210, 222, 224 for identification. In one embodiment, the identification devices 220, 232, 234 although heterogeneous, are interoperable. For example, in one embodiment identification devices 220 may comprise active type identification devices such as active RFID tags, identification devices 232 and also may comprise passive type identification devices such as passive RFID tag, and identification devices 234 may comprise bar codes. Other types of identification devices not herein described, such as EPC (Electronic Product Code) tags can also be used in some embodiments. Example identification devices are descried in further detail below with respect to FIGS. 3A-3C.

Figure 3A:
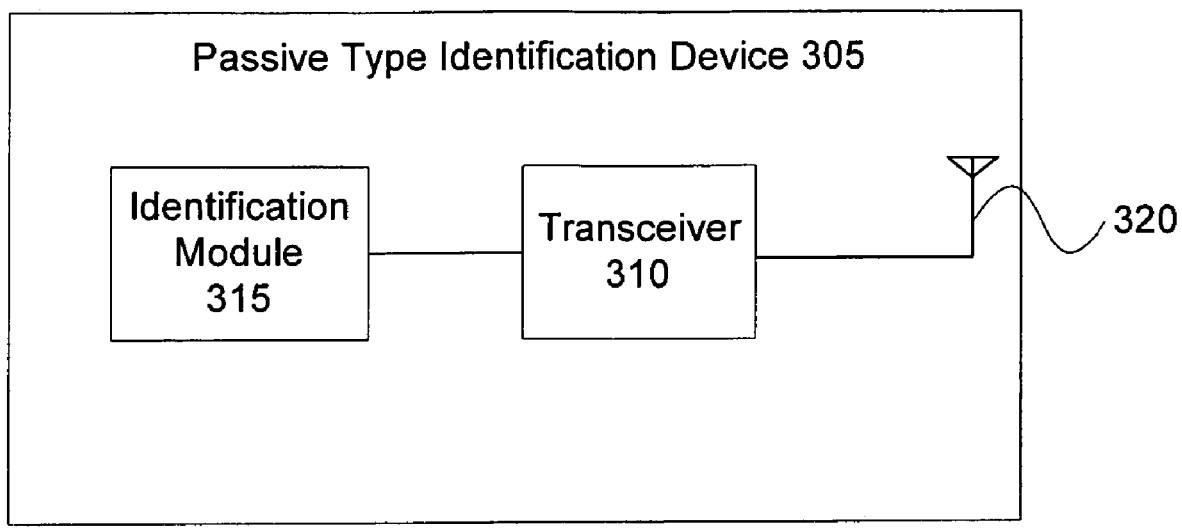
FIG. 3A is a block diagram illustrating a passive type identification device according to one embodiment of the present invention.

FIG. 3A is a block diagram illustrating a passive type identification device 305 according to one embodiment of the present invention. The passive type identification device 305, or "passive tag," is a simple device with no active elements. The passive type identification device 305 comprises an identification module 315, a transceiver 310, and a transmission means 320.

The identification module 315 includes programmed identification information associated with the container to which the passive type identification device 305 is attached. The transceiver 310 comprises the basic communication channels necessary to send identification information. The term transceiver is used loosely here, as the passive type identification device 305 does not truly receive data. Rather, the transceiver 310 responds to transmission signals to temporarily activate the passive type identification device 305 in order to transmit the identification information to the system via the transmission means 320. In one embodiment, the transmission means 320 is an antenna.

Figure 3B:
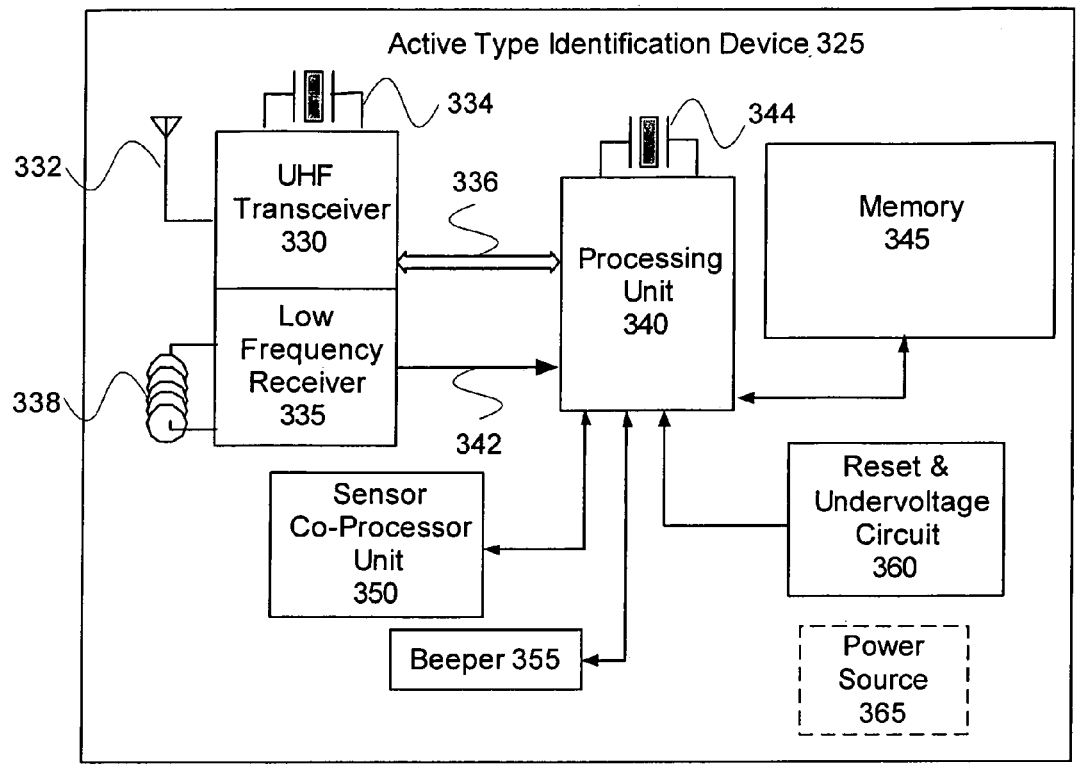
FIGS. 3B and 3C are block diagrams illustrating an active type identification device according to one embodiment of the present invention.

FIG. 3B is a block diagram block illustrating an active type identification device 325 according to one embodiment of the present invention. The basic structure of the active type identification device 325, or "active tag," includes an Ultra High Frequency (UHF) Transceiver 330, a Low Frequency Receiver 335, a Processing Unit 340, a Memory 345, a Sensor Co-Processor Unit 350, a Beeper 355, a Reset & Undervoltage Circuit 360, and a Power Source such as a battery 365.

The UHF transceiver 330 comprises physical, logical, analog and/or digital communication channels necessary to, for example, send and receive identification information, layer information, and the like to and from an active type or an integrated reader device 225. For example, if the identification device 325 comprises an RFID device, the UHF transceiver 330 comprises an RF transmitter and receiver. The signals transmit and receive through an antenna 332. An oscillator 334 controls clocking and synchronization and a data interface 336 connects the UHF transceiver 330 to the processing unit 340. In addition, the UHF transceiver 330 allows the identification device 325 to communicate with other active type identification devices.

The low frequency receiver 335 comprises physical, logical, analog and/or digital communication channels necessary to, for example, receive via antenna 338 signals from signposts within a specified distance of the active type identification device 325 to provide the active type identification device 325 location information. The low frequency receiver 335 interfaces 342 to the processing unit 340.

The processing unit 340 comprises, for example, a CPU (Central Processing Unit), a mobile CPU, a controller, or other device to execute instructions. In one embodiment, the processing unit 340 contains software for processing signals received from active type or integrated reader devices 225 and signposts. In one embodiment, processing includes sending and receiving to identification devices, as well as associating signals received from the devices. Clocking and synchronization for the active type identification device 325 are provided by an oscillator 344.

The memory 345 can be any volatile or non-volatile device capable of storing program instructions and/or data. The sensor co-processor unit 350 interfaces to the main processing unit 340, receives signals from passive type identification devices 305, and establishes the relative hierarchy of or relationship between containers. The sensor co-processor unit 350 is described in greater detail in conjunction with FIG. 3C.

The beeper 355 and reset and undervoltage circuit 360 serve as monitoring mechanisms for the active type identification device 325. The beeper 355 uses sound to indicate the location of the active type identification device 325 and that the container associated with the active type identification device 325 remains sealed. The reset and undervoltage circuit 360 monitors the processing unit 340 voltage and timing.

The battery 365 provides a source of direct current (DC) voltage to the active type identification device 325. The battery 365 is shown with a dotted line to indicate that it may be externally connected to the active type identification device 325.

Figure 3C:
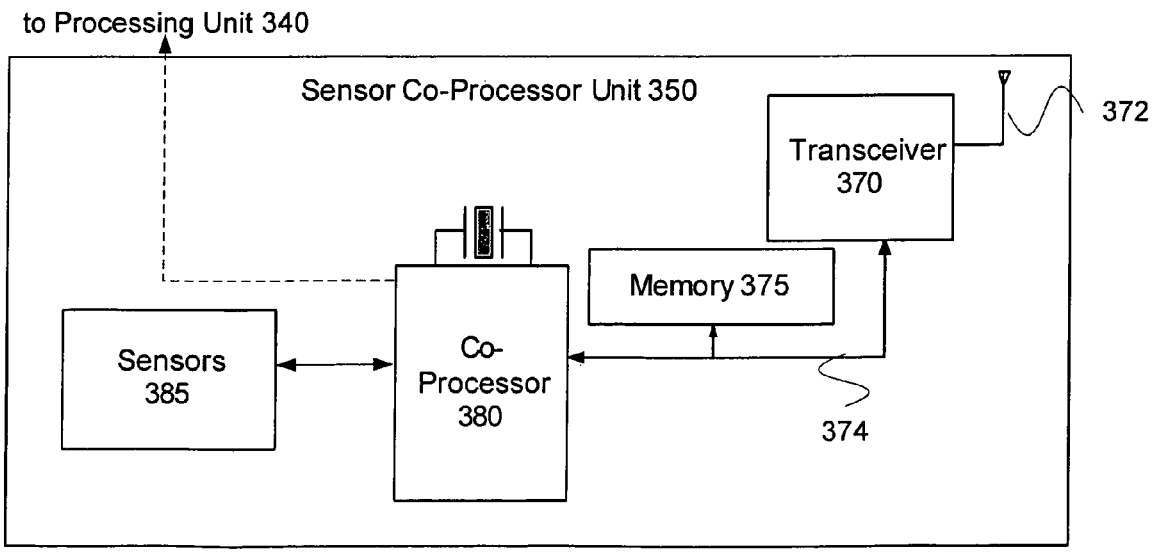

FIG. 3C is a block diagram block illustrating the sensor co-processor unit 350 in greater detail according to one embodiment of the present invention. As described above, the sensor co-processor unit 350 interfaces to the main processing unit 340, and receives signals from passive type identification devices 305. Thus, the sensor co-processor unit 350 can be thought of as a processor dedicated to passive type identification information. The basic structure of the sensor co-processor unit 350 includes a transceiver 370, a memory 375, a co-processor 380, and various sensors 380.

The transceiver 370 comprises physical, logical, analog and/or digital communication channels necessary to, for example, send and receive identification information, layer information, and the like to and from an passive type identification device 305 via an antenna 372. The transceiver 370 interfaces to the co-processor 380 and memory 375 via a data/expansion port 374.

The memory 375 can be any volatile or non-volatile device capable of storing program instructions and/or data. In one embodiment, the memory 375 is serial electrically erasable programmable read-only memory (EEPROM).

The co-processor 380 is similar to the processing unit 340 of FIG. 3B. It comprises a CPU (Central Processing Unit), a mobile CPU, a controller, or other device to execute instructions. In one embodiment, the co-processor 380 contains software for processing signals received from passive type identification devices 305.

Sensors 385 monitor various conditions relating to the integrity of the container. In one embodiment, the sensors 385 include a door open detector, a light sensor, a shock sensor, and a temperature and relative humidity sensor.

The configuration of the active type identification device 325 described in FIGS. 3B and 3C are only an example, and can modified according to desired capabilities.

Figure 4:
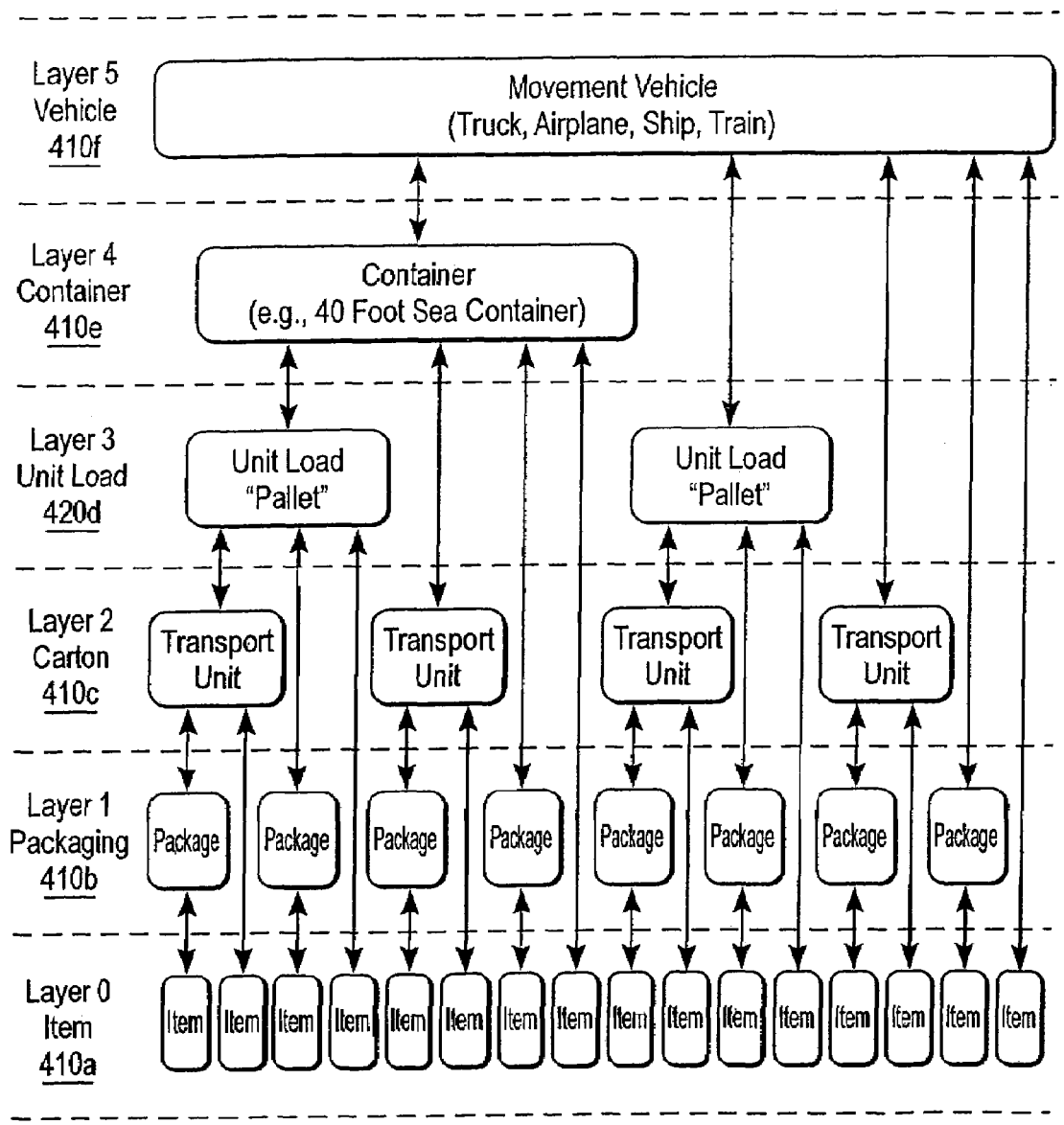
FIG. 4 is a block diagram illustrating ISO logistical layers within an example container hierarchy according to one embodiment of the present invention.

FIG. 4 is a block diagram illustrating ISO logistical layers within an example container hierarchy according to one embodiment of the present invention. The logistical layers or units include an item layer 410a, a packaging layer 410b, a carton layer 410c, a unit load layer 410d, a container layer 410e (not meant to redefine "container" as used herein), and a vehicle layer 410f. As shown in FIG. 4, each layer is capable of communicating identification information and layer information to each other layer in a many-to-many relationship to establish relative hierarchies. In one embodiment, layer information pertains to which logistical layer the nested container 185 belongs. In another embodiment, the container hierarchy uses non-ISO layers.

The item layer 410a comprises, for example, an item or good such as a computer with a serial number. The item can have a serial number or passive tag. The packaging layer 410b comprises, for example, a box used to enclose the item and its accessories. The packaging can have a bar code, UPC code, passive tag, or the like. The unit load layer 410c comprises, for example, one or more packages that are moved around together on a pallet. The unit layer 410d can have an active or passive tag. The container comprises, for example, a 40'×8'× 8' metal box of one or more pallets. The container can have an internally or externally mounted active or passive tag. The vehicle layer 410e comprises, for example, one or more containers. The vehicle can have an active or passive tag.

Figure 7A:
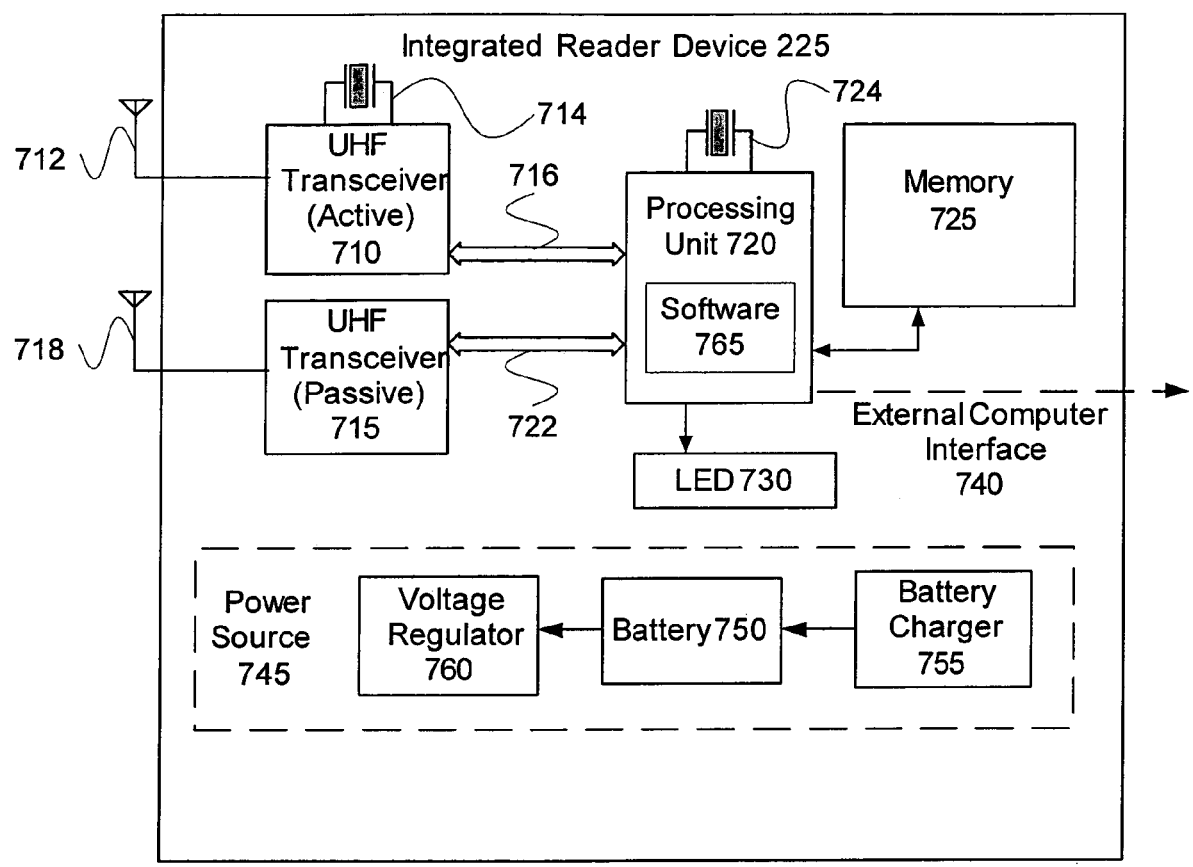
FIG. 7A is block diagram illustrating a dual mode reader device according to one embodiment of the present invention.

Referring now to FIG. 7A, it shows a block diagram of an integrated reader device 225 according to one embodiment of the present invention. The integrated reader device 225 is configured to read to and from both passive type 305 and active type 325 identification devices. In one embodiment, the integrated reader device 225 is handheld, as depicted in FIG. 7C. In another embodiment, the integrated reader device 225 is stationary. The integrated reader device 225 comprises a first (active) 710 and a second (passive) 715 UHF Transceiver, a Processing Unit 720, a Memory 725, a Light-Emitting Diode (LED) 730, and may have an External Computer Interface 740 and a Power Source 745.

The first UHF Transceiver (active) 710 comprises physical, logical, analog and/or digital communication channels necessary to, for example, send and receive identification information, layer information, and the like to and from active type identification devices 325 via an antenna 712. The first UHF Transceiver (active) 710 may be available from various vendors. The first UHF transceiver 710 is configured to transmit and receive signals from active type identification device 325 from distances up to three hundred feet. In one embodiment, the first UHF transceiver 710 transmits and receives signals of 433 MHz. An oscillator 714 controls clocking and synchronization and a data interface 716 connects the first UHF transceiver 710 to the processing unit 720. In addition, the first UHF transceiver 710 includes the necessary buffers and/or queues necessary for sending information to the processing unit 720 when the processing unit 720 is ready to accept the information.

The second UHF transceiver (passive) 715 comprises physical, logical, analog and/or digital communication channels necessary to, for example, send and receive identification information, layer information, and the like to and from passive type identification devices 305 via an antenna 718. The second UHF transceiver (passive) 715 may be available for purchase from various vendors, for example, Symbol Technologies of Oakland, Calif. In one embodiment, the second UHF transceiver 715 is configured to transmit and receive signals from passive type identification device 305 from distances up to thirty (30) feet. In other embodiments, the range may be greater. In one embodiment, the first UHF transceiver 710 transmits and receives signals of 900 MHz. The term transceiver is used loosely here, as the passive UHF transceiver 715 usually does transmit data to the passive type identification devices 305, but rather just receives data. A data interface 722 connects the second UHF transceiver 715 to the processing unit 720. In addition, the second UHF transceiver 715 includes the necessary buffers and/or queues necessary for sending information to the processing unit 720 when the processing unit 720 is ready to accept the information.

Processing unit 720 comprises, for example, a CPU (Central Processing Unit), a mobile CPU, a controller, or other device to execute instructions. In one embodiment, the processing unit 720 contains software 765 for processing signals received from an integrated reader device 225. The software 765 is discussed in further detail in conjunction with FIG. 7B. An oscillator 724 controls clocking and synchronization of the processing unit 720.

The processing unit 720 is capable of switching back and forth between sending and receiving active and passive signals. In addition, the processing unit 720 performs various other processing functions for the integrated reader device 225, as discussed in conjunction with FIG. 7B.

In one embodiment (not shown), the processing unit 720 comprises two separate units, one processor for processing signals from active type identification devices 325 and one processor processing signals from passive type identification devices 305. In this embodiment, the processors are communicatively coupled and the integrated reader device 225 may comprise an active type reader and a passive type reader. Also in this example, the passive and active readers are removable from each other and collect information independently.

The memory 725 can be any volatile or non-volatile device capable of storing program instructions and/or data. The LED 730 is an indicator that data is being sent and/or received, and may also indicate that the integrated reader device 225 is receiving power.

The integrated reader device 225 also may include an external computer interface 740 and/or a power source 745. An external computer interface 740, if present, serves to connect the integrated reader device 225, for example, to a site manager 250 or other computer. For example, the external computer interface 740 may connect to a separate processor (not shown) with software for generating interrogation signals.

The power source 745, if present, powers the integrated reader device 225. The power source 745 includes a battery 750 as a source of current, a battery charger 755, and a voltage regulator 760. In an alternative embodiment, the power source 745 is externally connected to or is separate from the integrated reader device 225.

Figure 7B:
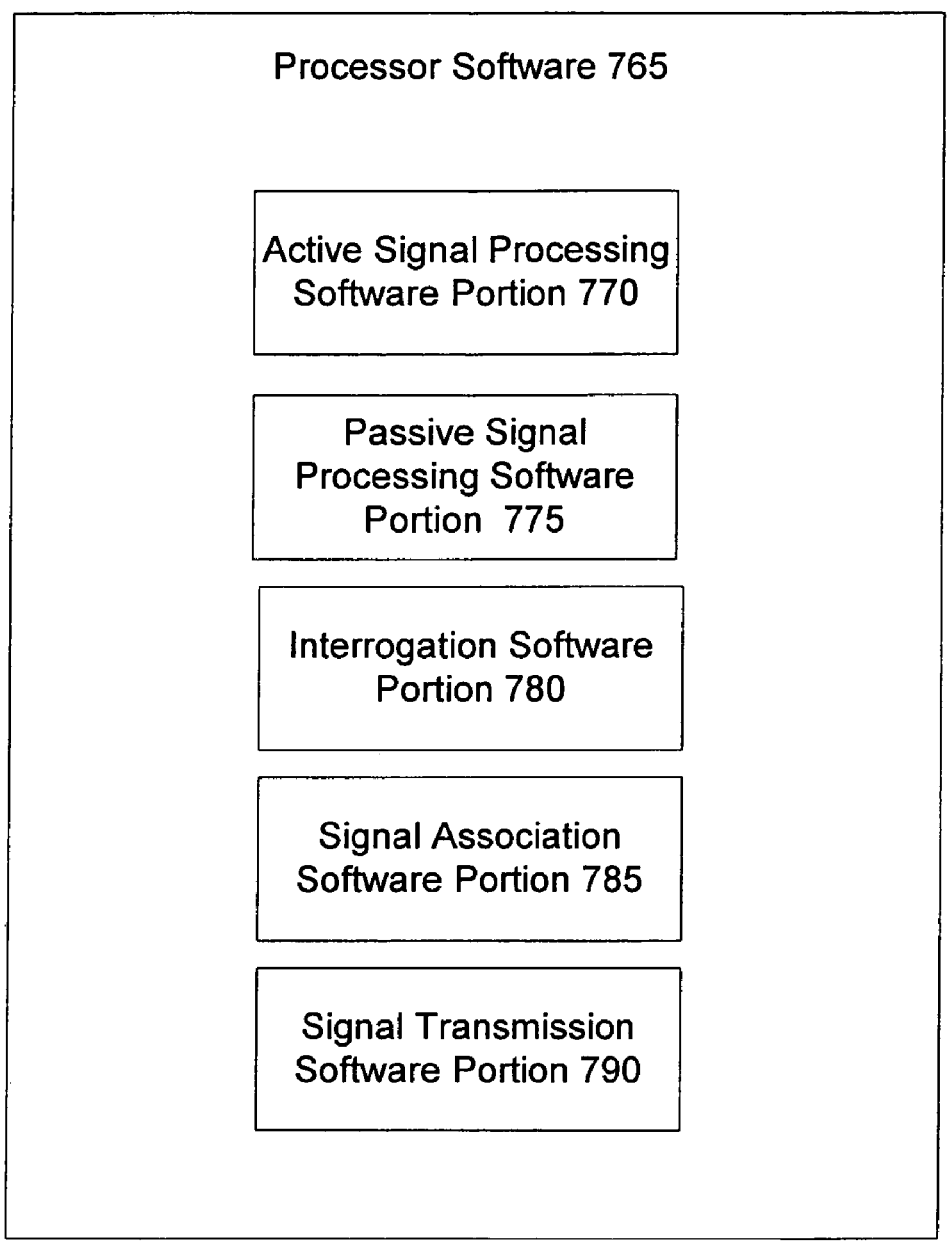
FIG. 7B is a block diagram illustrating an exemplary software configuration for a dual mode reader device according to one embodiment of the present invention.
Figure 7C:
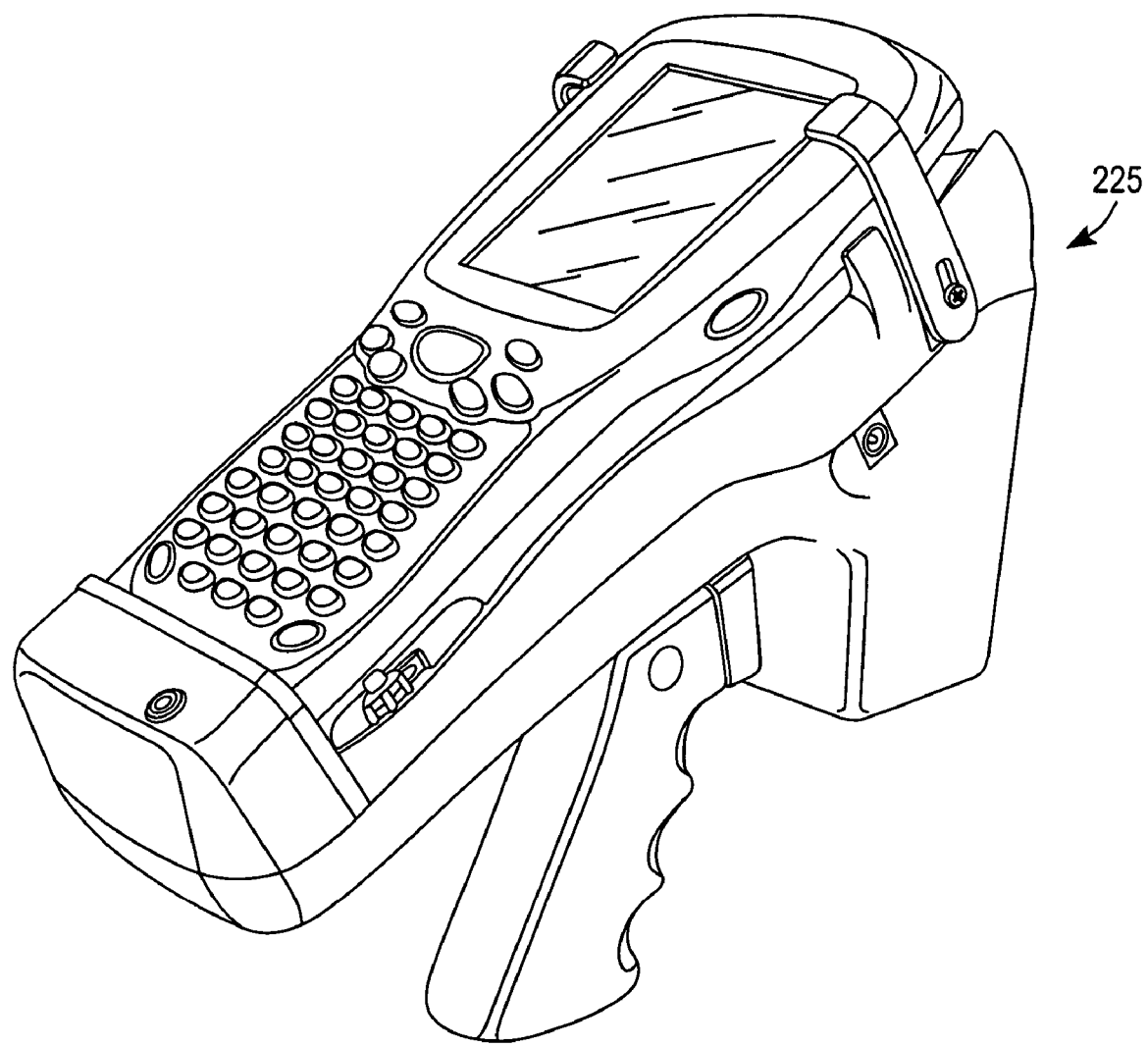
FIG. 7C is a perspective diagram illustrating a handheld dual mode reader device according to one embodiment of the present invention.

Referring now to FIG. 7B, there is shown a block diagram illustrating an exemplary software configuration 765 for a dual mode reader device according to one embodiment of the present invention. In one embodiment, the software 765 includes an active signal processing portion 770, a passive signal processing portion 775, an interrogation portion 780, a signal association portion 785, and a signal transmission portion 790.

The active signal processing portion 770 includes software for processing signals sent to and received from active type identification devices 325. The passive signal processing portion 775 includes software for processing signals sent to and received from passive type identification devices 305. The interrogation portion 780 includes software for initiating signals to interrogate active 325 and passive type identification devices 305. The signal association portion 785 includes software for associating with each other signals from various passive 305 and various active identification devices 325, mirroring the associations of their respective containers. The signal transmission portion 790 includes software for transmitting processed signals to an external computer. The above software portions 770-790 need not be discrete software modules. The configuration shown is meant only by way if example; other configurations are anticipated by and within the scope of the present invention.

Thus, the integrated device 225 is capable of reading heterogeneous tag types. This allows passive 305 and active tags 325 to be read using a single device and to establish the interrelationship between the heterogeneous tag types. The integrated reader 225 is advantageous over traditional readers that require separate readers for each tag type because a single reader is capable of reading both active and passive tags, at great savings of time, money, and equipment.

Figure 8:
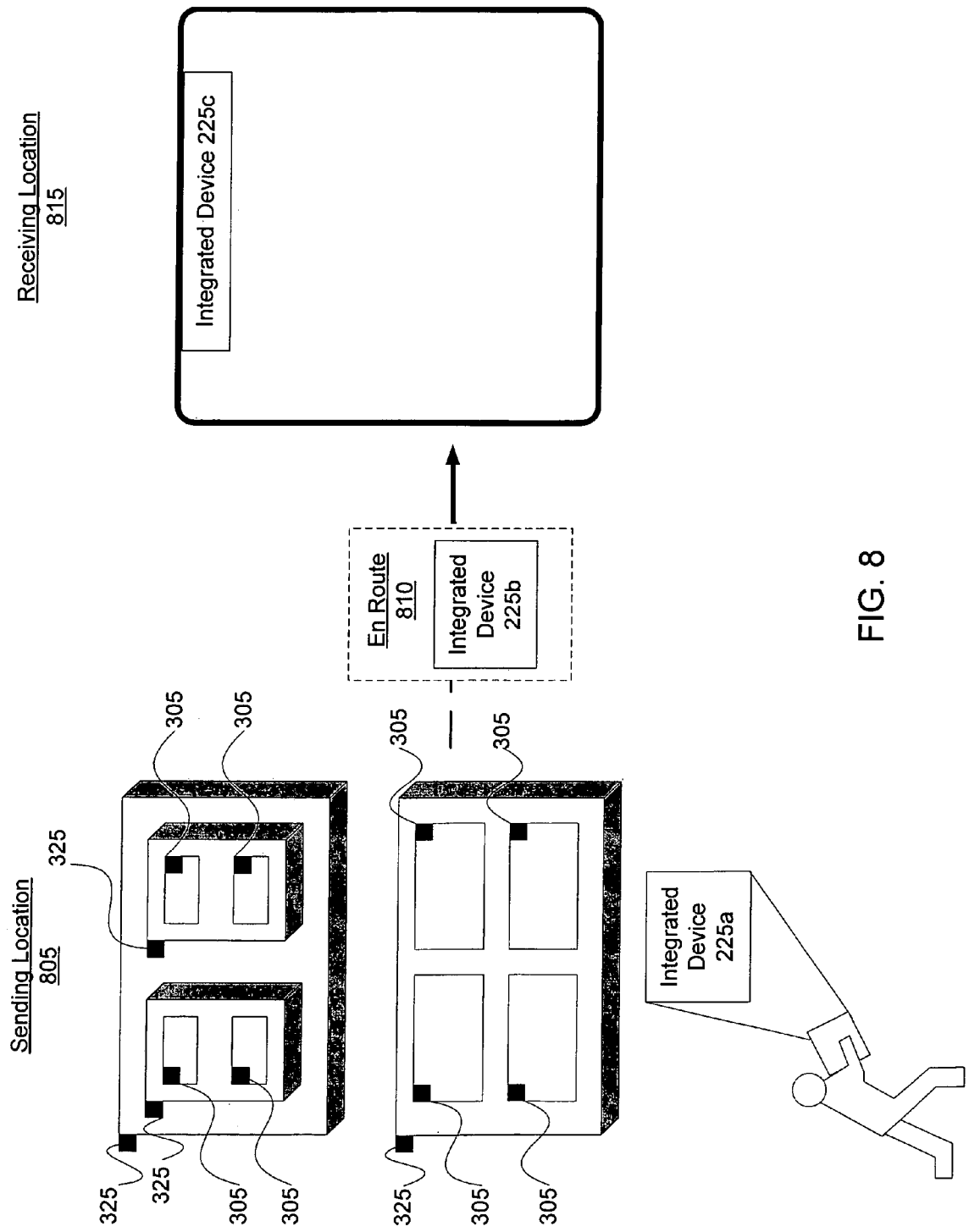
FIG. 8 is a schematic diagram illustrating exemplary locations at which information can be exchanged amongst identification devices and between identification devices and integrated reader devices according to one embodiment of the present invention.

FIG. 8 is a schematic diagram illustrating examples of locations 805-815 at which information can be exchanged amongst identification devices 305, 325 and between identification devices 305, 325 and integrated reader devices 225 according to one embodiment of the present invention.

In one embodiment, collection of identification information may initiate at a sending location 805, such a shipper 105*a* or origin port 105*b* as containers are packaged. At the sending location 805, an integrated reader device 225*a* is used to collect identification information from active type 325 and passive type 305 identification devices. For example, is a handheld integrated reader device 225*a* is used, the handheld device is placed within the range of the tags to be read and identification information is collected therefrom. If the device is a stationary reader device 225*c*, as containers pass in the proximity of the stationary device within the range of the tags, for example on a conveyor belt or in a transport vehicle, the tags are read and identification information is collected therefrom. The integrated reader device 225*a* may receive signals from each identification device 305, 325 individually, or may receive information about several identification devices 305, 325 from one or more active type identification devices 325. These processes are described in greater detail in conjunction with FIG. 9.

While en route 810 from sending location 805 to receiving location 815, identification devices 305, 325 may be interrogated by active type or integrated reader devices 225*b*. In addition, identification devices 305, 325 may intercommunicate to establish how their respect associated containers are related (e.g., nested or adjacent). These processes are described in greater detail in conjunction with FIGS. 5 and 6.

In one embodiment, the final interrogation of container identification information occurs as containers arrive at the receiving location 815, such as a destination port 105*d* or consignee 105*e*. At the receiving location 815, containers may pass by integrated reader devices 225*c*. The integrated reader devices 225*c* may transmit and receive identification information from active type 325 and passive type 305 identification devices. The integrated reader devices 225*c* may receive signals from each identification device 305, 325 individually, or may receive information about several identification devices 305, 325 from one or more active type identification devices 325. These processes are described in greater detail in conjunction with FIG. 10.

Figure 9:
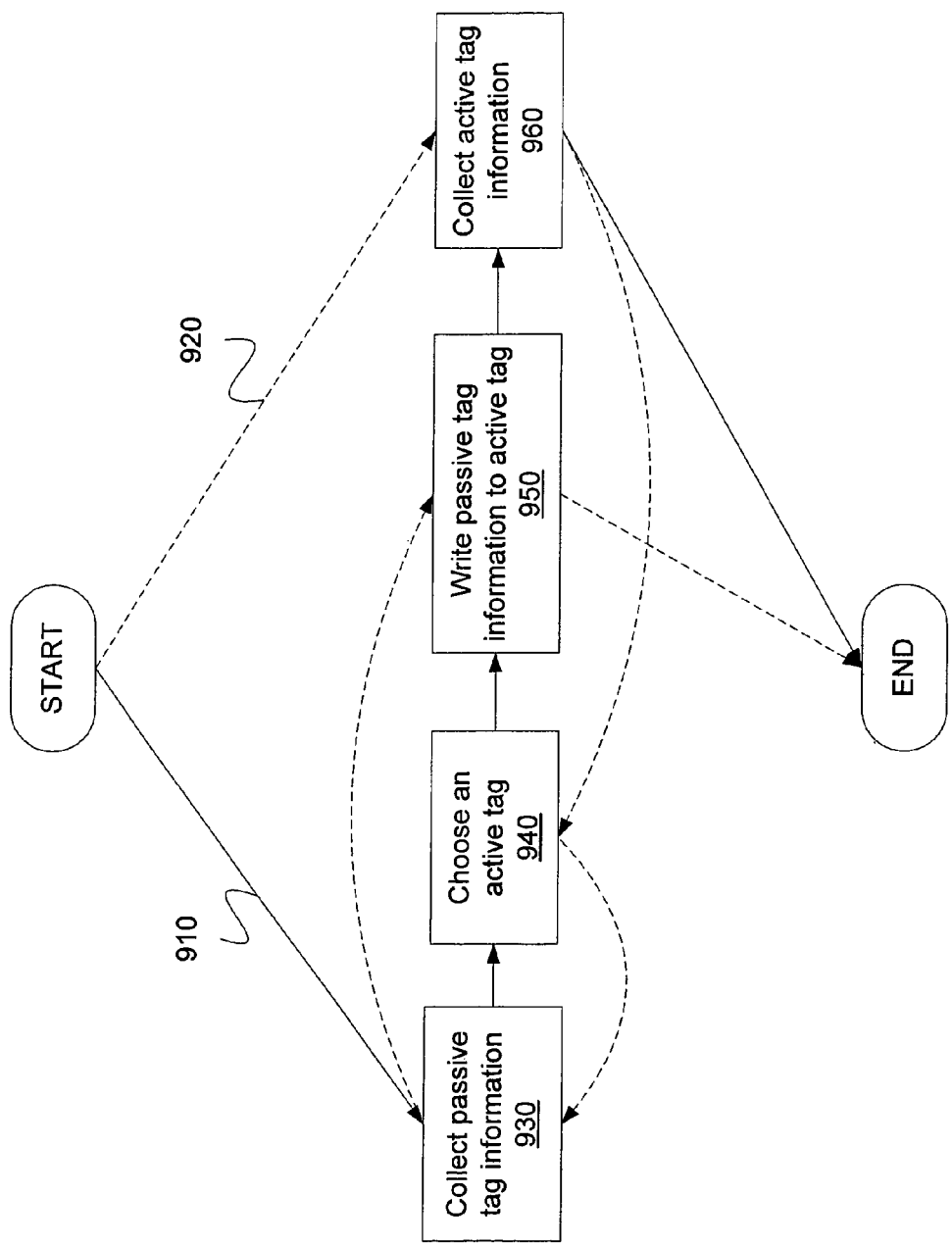
FIG. 9 is a flow chart illustrating examples of collecting identification information according to embodiments of the present invention.

FIG. 9 is a flow chart illustrating two examples 910, 920 of a method for collecting identification information according to one embodiment of the present invention. The examples are methods of collecting identification information from a series of containers, for example, during packaging at a sending location 805.

In one embodiment (shown as solid line 910), the process begins by collecting 930 passive device identification information from one or more passive identification devices 305. Next, an active identification device 325 is chosen 940 from the available devices. For example, an active tag 325 may be chosen 940 such that its container encloses the passive identification device 305 containers. Then, the passive tag information collected at step 930 is written 950 to the selected active tag 325. These steps may repeat as necessary to accommodate the various nested containers with active type 325 and passive type identification devices 305. Finally, identification information is collected 960 from the active tags 325.

For example, this process might be used at a warehouse when loading items into containers. In this scenario, an agent may have one or more shipping containers into which container units and items are to be loaded for shipping. For instance, at the item level, each piece may have a passive type tag associated with it. As each item is loaded into a container unit, the item's identification information is collected 930. As the agent places the item into a container unit, for example within a shipping container, the active tag identification device associated with the larger container is selected 940 and the passive tag information is written 950 to the selected active tag. The agent repeats the process until the container unit is full. Then, the identification information can be collected 960 from the active tag associated with the container unit, which will include the identification information about the passive tags read to the active tag in step 950. Likewise, the active tag information from other container units within the shipping container can be collected in a manner similar to the above process 930-940 and written 950 to an active tag associated with the shipping container. When the shipping container is full, identification information can be collected 960 from the active tag associated with the shipping container.

In another embodiment (shown as dotted line 920), the process begins by collecting 960 identification information from active type identification devices 325. Next, an active identification device 325 is chosen 940 from the devices 325 from which identification information was collected in step 960. Then, passive device identification information is collected 930. Finally, the passive tag information collected at step 930 is written 950 to the selected active tag 325.

For example, this process might be used at a warehouse when loading items into containers. In this scenario, an agent may have one or more shipping containers into which container units and items are to be loaded for shipping. For instance, each item may have a passive type tag associated with it and each container unit an active tag associated with it. First, the agent collects 960 identification information from each of the active tags associated with the container units. Next, the agent chooses a single container unit from the group of container units, in which he will load the items, thus selecting 940 the active tag associated with the container unit. Then the agent collects 930 the passive tag identification information from each item as it is loaded into the container unit. Finally, the identification information collected from the passive tags is written 950 to the active tag selected at step 940.

Figure 5:
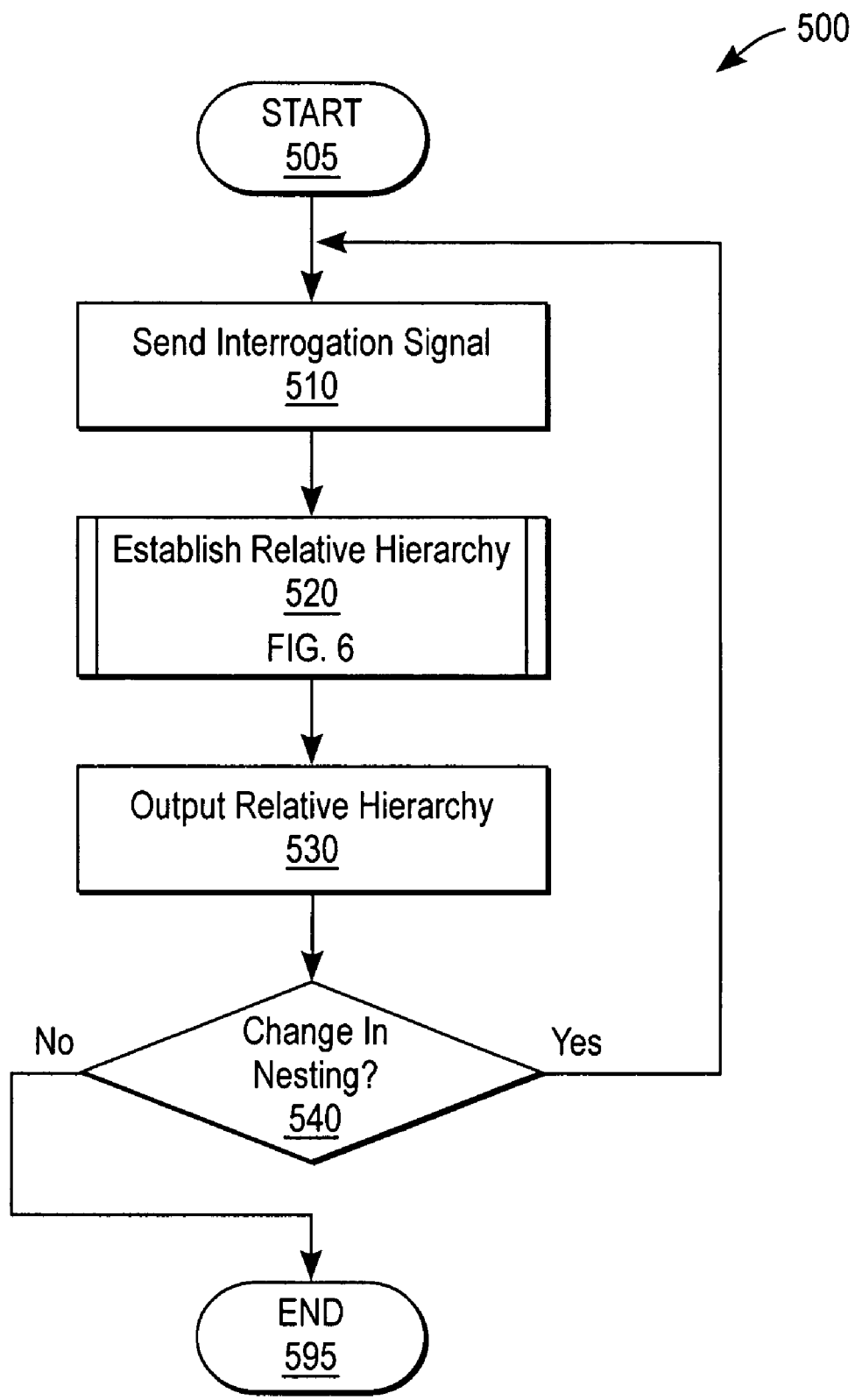
FIG. 5 is a flow chart illustrating a method for providing nested visibility according to one embodiment of the present invention.

FIG. 5 is a flow chart illustrating a method 500 for providing nested visibility according to one embodiment of the present invention. The method 500 may take place at various times, for example, while en route 810 from sending location 805 to receiving location 815.

In one embodiment, an active type identification device 325 receives 510 an interrogation signal. The interrogation signal invokes a response of identification and layer information through various identification devices 305, 325. While the following description relates to a single active type identification device 325, each respective active tag is capable of the following process.

The processing unit 340 of the active type identification device 325 establishes 520 a relative hierarchy as discussed further below with respect to FIG. 6. The relative hierarchy based on responses to the interrogation signal provides visibility from that layer. Thus, an interrogator of the identification device 325, such as an integrated reader 225, can gather information about the container and its nested and adjacent containers from a single device interaction.

The UHF transceiver 330 of the active tag 325 outputs 530 the relative hierarchy. The output can be in response to a regular communication with a reader, a specific interrogation signal, or due to a periodic publication to subscribers. The output may be to a integrated reader device 225, for example via an agent with a hand-held device.

If there is a change in nesting 540, the process repeats. A change in nesting may occur, for example, if a smaller container is loaded into a larger container while the container is en route. In this example, the information about the container may be read by a reader device as the container passes though the door of the larger container. Thus, the container information would be downloaded to an active type identification device 325 associated with the larger container. Because the tags can communicate with each other, any such changes in nesting that occur can be correctly stored by the outermost active identification device.

Figure 6:
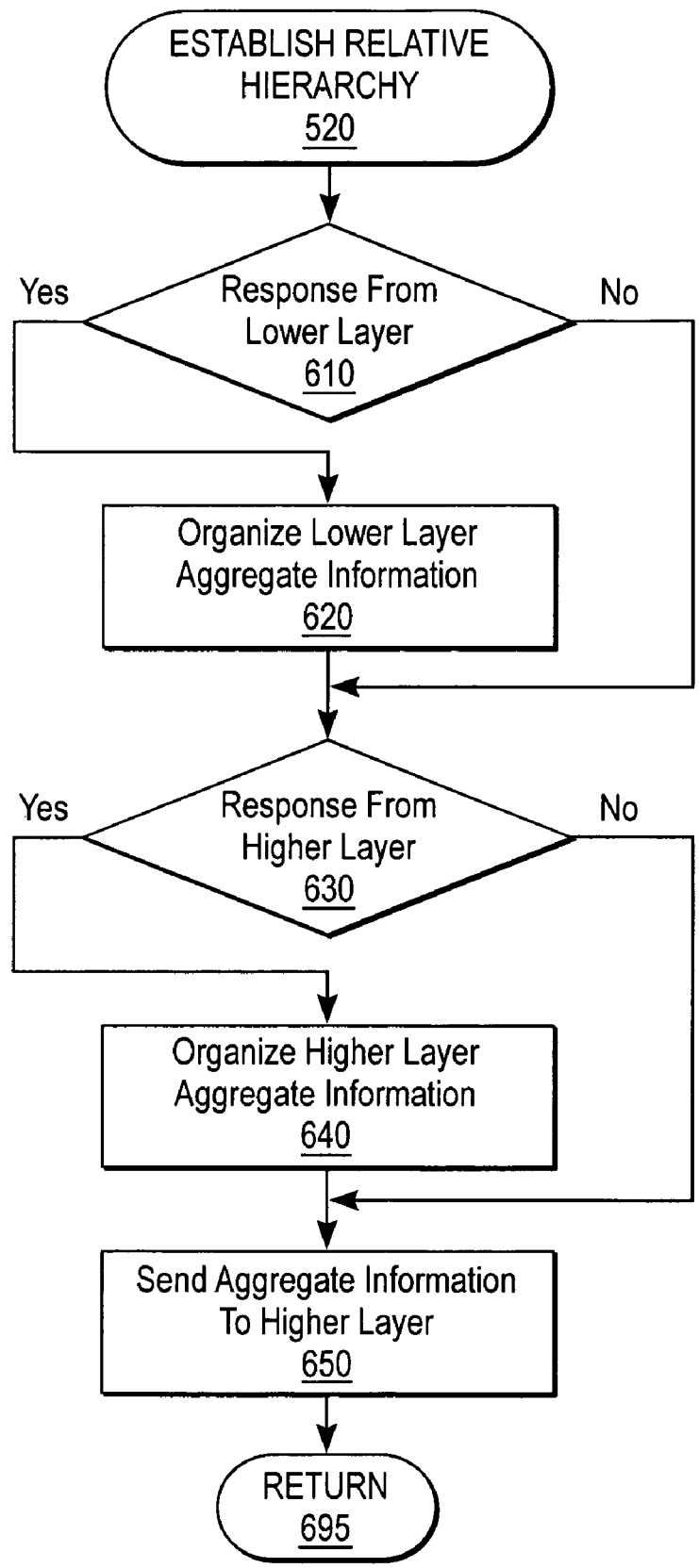
FIG. 6 is a flow chart illustrating a method for establishing the relative hierarchy according to one embodiment of the present invention.

FIG. 6 is a flow chart illustrating the method 520 for establishing the relative hierarchy according to one embodiment of the present invention. The relative hierarchy is based on responses from neighboring and nested containers. In one embodiment, association information can be pre-loaded at a checkpoint in the global supply chain 100. If responses are received at an active tag 325 from lower-layer containers 610, for example containers within the container associated with the active tag 325, the processing unit 340 of the active tag 325 organizes 610 data from these containers into lower-layer aggregate information to establish hierarchical information about the containers and their contents. In one embodiment, organization includes arranging data in a hierarchy mirroring the hierarchy of the layers. The aggregate information can comprise several layers to delineate a sub-hierarchy. In addition, responses can be received at an active tag 325 from other active tags 325 on adjacent containers, for example containers stacked several layers deep below the first container.

Likewise, if the responses are received from higher-layer containers 630, it also organizes 640 these containers into higher-layer aggregate information comprising several layers and a sub-hierarchy. In one embodiment, the processor 340 sends 650 aggregated information to known higher-layer containers. The device 325 also may store information about peer hierarchies that respond to the interrogation signal in memory 345.

Because a many-to-many relationship exists among layers, some information can be duplicitous. Thus, one embodiment recognizes and removes duplicitous material. Another embodiment uses duplicitous information for verification or reliability scoring. In yet another embodiment, conflicting information is resolved through various methods such as using the highest-layer information, or using the directly obtained information.

The above example represents just one embodiment of a method for providing nested visibility according to the present invention. Variations of the above methods are contemplated by the present invention and will be apparent to those of skill in the art.

Figure 10:
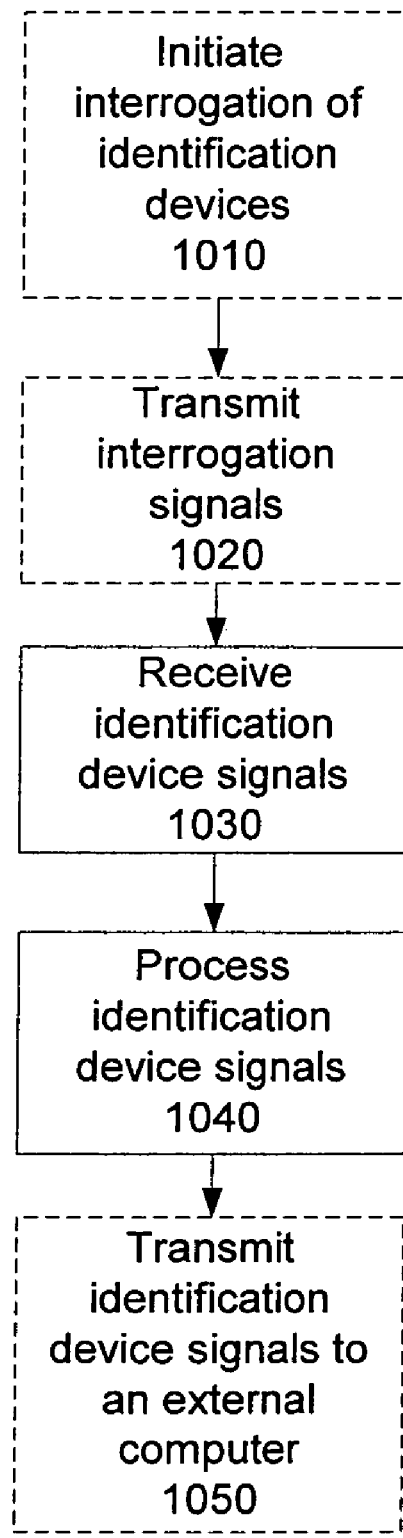
FIG. 10 is a flow chart illustrating a method of collecting identification information according to one embodiment of the present invention.

FIG. 10 is a flow chart illustrating a method of collecting identification information according to one embodiment of the present invention. The embodiment depicted is a method of collecting identification information from a series of containers, for example, during unloading at receiving location 815.

In one embodiment, the process begins by the processor 720 of an integrated reader device 225 initiating interrogation 1010 of a plurality of identification devices 305, 325. In another embodiment, the interrogation signals initiate from software external to the integrated reader device 225, for example, in a computer connected to the integrated reader device 225 via an external computer interface 740. Next, the transceivers 720, 715 of the integrated reader device 225 transmit 1020 the interrogation signals to the identification devices 305, 325. Then, identification information signals are received 1030 from the identification devices 305, 325.

Following receiving the signals, the integrated reader device 225 processes 1040 the signals. In one embodiment, processing 1040 includes processing includes associating identification information signals from various types of identification devices 305, 325. In a final step, processed signals are transmitted 1050 to an external computer.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A method for collecting identification information from a plurality of identification devices associated with a plurality of containers, the method comprising:

transmitting from a reader device an interrogation signal to the plurality of identification devices associated with the plurality of containers, each of the plurality of identification devices configured to receive the interrogation signal from the reader device;

receiving at the reader device, from a first identification device of the plurality of identification devices to which the signal was transmitted, information including identification information about a second identification device of the plurality of identification devices to which the signal was transmitted, the information previously received at the first identification device from the second identification device, wherein the first identification device is one of at least two of the plurality of identification devices configured to independently communicate the identification information to the reader device; and storing the received information.

2. The method of claim 1, wherein the first identification device is associated with a first container, the second identification device is associated with a second container and the second container is adjacent to the first container.

3. The method of claim 1, wherein the information received includes identification information about a third identification device associated with a third container.

4. The method of claim 3, wherein the second identification device is associated with a second container, the second and third containers are adjacent to the first container.

5. The method of claim 3, wherein the first identification device is associated with a first container and the second identification device is associated with a second container, the first, second, and third containers are stacked, wherein the first container is on top of the second container, which is on top of the third container.

6. The method of claim 1, wherein the first identification device is associated with a first container, the second identification device is associated with a second container and the second container is remote from the first container.

7. The method of claim 1, wherein the first identification device is configured to receive identification information from another of the plurality of identification devices.

8. The method of claim 1, wherein the first identification device is associated with a first container, the second identification device is associated with a second container and the second container is enclosed within the first container.

9. The method of claim 1, wherein the first identification device is associated with a first container, the second identification device is associated with a second container and the information received includes identification information about a third container, wherein the first, second, and third containers are nested, wherein the first container encloses the second container, which encloses the third container.

10. The method of claim 1, wherein the first identification device is an active type device.

11. The method of claim 1, wherein the second identification device is a passive type identification device.

12. The method of claim 1, wherein the second identification device is an active type identification device.

* * * * *